(12) United States Patent
Lindberg Nilsson et al.

(10) Patent No.: US 12,211,290 B2
(45) Date of Patent: Jan. 28, 2025

(54) VEHICLE PARKING FINDER SUPPORT SYSTEM, METHOD AND COMPUTER PROGRAM PRODUCT FOR DETERMINING IF A VEHICLE IS AT A REFERENCE PARKING LOCATION

(71) Applicant: Ningbo Geely Automobile Research & Development Co., Ltd., Ningbo (CN)

(72) Inventors: Erik Lindberg Nilsson, Gothenburg (SE); Jonathan Johansson, Gothenburg (SE)

(73) Assignee: Ningbo Geely Automobile Research &Dev. Co., Ltd., Ningbo (CN)

(*) Notice: Subject to any disclaimer, the term of this patent is extended or adjusted under 35 U.S.C. 154(b) by 310 days.

(21) Appl. No.: 17/710,081

(22) Filed: Mar. 31, 2022

(65) Prior Publication Data

US 2022/0222948 A1   Jul. 14, 2022

Related U.S. Application Data (63) Continuation of application No. PCT/CN2020/118062, filed on Sep. 27, 2020.

(30) Foreign Application Priority Data

Oct. 16, 2019   (EP) .................................... 19203614

(51) Int. Cl.
*G06V 20/58* (2022.01)
*G06V 10/75* (2022.01)

(52) U.S. Cl.
CPC ............ *G06V 20/586* (2022.01); *G06V 10/75* (2022.01)

(58) Field of Classification Search
None
See application file for complete search history.

(56) References Cited

U.S. PATENT DOCUMENTS

2009/0207045 A1   8/2009  Jung
2013/0265428 A1*  10/2013  Yoon ...................... H04N 7/183
                                                                348/148

(Continued)

FOREIGN PATENT DOCUMENTS

CN        101952688 A      1/2011
CN        108416808 A      8/2018

(Continued)

OTHER PUBLICATIONS

International Search Report from corresponding International Application No. PCT/CN2020/118062, mailed on Dec. 30, 2020, 2 pages.

*Primary Examiner* — Soo Shin
(74) *Attorney, Agent, or Firm* — Tucker Ellis LLP (57) ABSTRACT

A vehicle parking finder support system, method and computer program product for determining if a vehicle is at a reference parking location. The vehicle parking finder support system includes at least a first camera configured to provide images of the surroundings of the vehicle; a memory; a processing circuitry operatively connected to the at least first camera and the memory, configured to cause the vehicle parking finder support system to: obtain, by the at least first camera, at least first image data of the surroundings of the vehicle; obtain, from the memory, at least first reference image data; and determine if the vehicle is at the reference parking location using the at least first reference image data and the obtained at least first image data.

13 Claims, 6 Drawing Sheets

(56) References Cited

U.S. PATENT DOCUMENTS

| | | | | |
|---|---|---|---|---|
| 2014/0063197 | A1* | 3/2014 | Yamamoto | G06T 11/001 348/46 |
| 2014/0118549 | A1* | 5/2014 | Meldrum | B60R 1/27 348/148 |
| 2015/0161881 | A1* | 6/2015 | Takemura | G06V 20/56 348/148 |
| 2015/0206014 | A1* | 7/2015 | Wu | G06V 20/52 348/149 |
| 2015/0302574 | A1* | 10/2015 | Muramatsu | B62D 15/0275 348/148 |
| 2015/0346727 | A1* | 12/2015 | Ramanujam | B62D 15/0285 701/23 |
| 2016/0306535 | A1* | 10/2016 | Krishnamoorthy | G08G 1/04 |
| 2017/0203769 | A1* | 7/2017 | Ohta | B60W 50/14 |
| 2018/0045535 | A1* | 2/2018 | Kim | G08G 1/205 |
| 2018/0086381 | A1* | 3/2018 | Hoffman, Jr. | G05D 1/0225 |
| 2018/0099661 | A1* | 4/2018 | Bae | B60W 30/06 |
| 2018/0144622 | A1* | 5/2018 | Gage | H04N 1/00103 |
| 2018/0186407 | A1* | 7/2018 | Kim | B60W 10/18 |
| 2019/0384304 | A1* | 12/2019 | Towal | G05D 1/0221 |

FOREIGN PATENT DOCUMENTS

| | | |
|---|---|---|
| CN | 109948591 A | 6/2019 |
| CN | 109949365 A | 6/2019 |
| DE | 102005008876 A1 | 9/2006 |
| EP | 3165425 A1 | 5/2017 |

* cited by examiner

Fig. 6

VEHICLE PARKING FINDER SUPPORT SYSTEM, METHOD AND COMPUTER PROGRAM PRODUCT FOR DETERMINING IF A VEHICLE IS AT A REFERENCE PARKING LOCATION

RELATED APPLICATION DATA

This application is a continuation of International Patent Application No. PCT/CN2020/118062, filed Sep. 27, 2020, which claims the benefit of European Patent Application No. 19203614.3, filed Oct. 16, 2019, the disclosures of which are incorporated herein by reference in their entireties.

TECHNICAL FIELD

The present disclosure relates to a vehicle parking finder support system for determining if a vehicle is at a reference parking location, a method for determining if a vehicle is at a reference parking location and a computer program product.

BACKGROUND

When parking a vehicle, the vehicle occupant needs to make sure that the vehicle is parked at a correct parking location. Parking at a wrong parking location may result in getting a ticket or even that the vehicle is towed away from the wrong parking location. It is common that a vehicle has a reserved parking that is allowed to use for parking the vehicle. In an example, a vehicle occupant may have a certain parking location at home, at work or at another location where the vehicle can be parked without violating rules and getting a parking ticket. Today a vehicle occupant needs to observe where the vehicle occupant is parking the vehicle. For example, the vehicle occupant looks at signs and the surroundings to verify that the vehicle is parked at the correct parking location. It is common to use e.g. a reference number or a text assigned to the correct parking location so that the vehicle occupant can verify that the parking location is the correct parking location. Even if a vehicle occupant is observing the surroundings when parking the vehicle, it can happen that the vehicle is parked at a wrong parking location, e.g. the parking at the parking spot just next to the correct parking spot that will result in a parking at a wrong parking location.

The use of a global positioning system for determining a geographical location of a vehicle is not always that accurate and the error can exceed the size of a normal parking location. The accuracy worsens near buildings or inside of buildings, near trees, and underground etc.

SUMMARY

It is an object of the present disclosure to mitigate, alleviate or eliminate one or more of the above-identified deficiencies and disadvantages in the prior art and solve at least the above mentioned problem. With autonomous driving vehicle, there is no vehicle occupant that can observe the surroundings when parking the autonomous driving vehicle. There is hence also a need for an autonomous driving vehicle to be able to park at a correct parking location.

According to a first aspect there is provided a vehicle parking finder support system for determining if a vehicle is at a reference parking location, the vehicle parking finder support system comprises: at least a first camera configured to provide images of the surroundings of the vehicle; a memory configured to store data; a processing circuitry operatively connected to the at least first camera and the memory, configured to cause the vehicle parking finder support system to: obtain, by the at least first camera, at least first image data of the surroundings of the vehicle; obtain, from the memory, at least first reference image data; and determine if the vehicle is at the reference parking location using the at least first reference image data and the obtained at least first image data.

An advantage is that the content of the reference image data can then be used for comparing the content of the at least first image data of the surroundings of the vehicle to determine if the vehicle is back at the reference parking location.

According to some embodiments, the vehicle parking finder support system further comprises a user interface operatively connected to the processing circuitry configured to receive user input by a vehicle occupant, and the processing circuitry is further configured to, cause the vehicle parking finder support system to: receive, via the user interface, a first input by the vehicle occupant indicative of that the vehicle is at the reference parking location; obtain, by the at least first camera, at least first image data of the surroundings of the vehicle while the vehicle remains at the reference parking location; and store the at least first image data as reference image data in the memory.

An advantage is that the vehicle occupant can then indicate to the system via the user interface when the vehicle is at the location that is going to be the reference parking location, so that the obtained at least first image data of the surroundings of the vehicle, while the vehicle remains at the reference parking location, can be stored as reference image data in the memory.

According to some embodiments, the vehicle parking finder support system further comprises a position sensor operatively connected to the processing circuitry configured to determine the geographical location of the vehicle, and the processing circuitry is further configured to, cause the vehicle parking finder support system to: obtain, by the position sensor, parking location data associated with the location of the vehicle while the vehicle remains at the reference parking location; and store the parking location data as reference parking location data.

An advantage with this is that the vehicle occupant can then indicate to the vehicle parking finder support system via the user interface when the vehicle is at the location that is going to be the reference parking location, so that the obtained parking location data then can be stored as reference parking location data in the memory.

According to some embodiments, the processing circuitry is further configured to cause the vehicle parking finder support system to: obtain, by the position sensor, parking location data associated with the location of the vehicle; obtain, from the memory, reference parking location data; and determine if the vehicle is at the reference parking location using the reference parking location data and the obtained parking location data.

An advantage with this is that the information about the geographical location of the vehicle can hence be compared with the reference parking location data to determine if the vehicle is at the reference parking location.

According to some embodiments, the processing circuitry is further configured to, cause the vehicle parking finder support system to: identify the presence of at least a first object in the at least first image data by object recognition processing of the at least first image data; and store attributes of the identified at least first object as object attribute data in the memory.

An advantage with identifying the presence of at least a first object and storing attributes of the identified at least first object is that the object attribute data can be used to define the content of the at least first image data. This in turn can be used when e.g. comparing the content of the at least first image data with the content of the reference image data.

According to some embodiments, the processing circuitry is further configured to, cause the vehicle parking finder support system to: associate object attribute data with a time stamp data; and determine the presence of the at least first object in the at least first image data dependent on the time of day, based on the object attribute data and the time stamp data.

An advantage with the time stamp data is that e.g. a history data describing when a certain object is present in the at least first image data can be generated and i.e. the relevance of the certain object in the at least first image, dependent on the time of the day.

According to a second aspect there is provided a method for determining if a vehicle is at a reference parking location, the method comprising: obtaining, by at least a first camera, at least first image data of the surroundings of the vehicle; obtaining, from a memory, at least first reference image data; and determining if the vehicle at the reference parking location using the at least first reference image data and the obtained at least first image data.

An advantage is that the content of the reference image data can then be used for comparing the content of the at least first image data of the surroundings of the vehicle to determine if the vehicle is back at the reference parking location.

According to some embodiments, the method further comprises: receiving, via a user interface, a first input by the vehicle occupant indicative of that the vehicle is at a reference parking location; obtaining, by the at least first camera, at least first image data of the surroundings of the vehicle while the vehicle remains at the reference parking location; and storing the at least first image data as reference image data in the memory.

An advantage is that the vehicle occupant can then indicate to the vehicle parking finder support system via the user interface when the vehicle is at the location that is going to be the reference parking location, so that the obtained at least first image data of the surroundings of the vehicle, while the vehicle remains at the reference parking location, can be stored as reference image data in the memory.

According to some embodiments, the method further comprises: identifying the presence of at least a first object in the at least first image data by object recognition processing of the at least first image data; and storing attributes of the identified at least first object as object attribute data in the memory.

An advantage with identifying the presence of at least a first object and storing attributes of the identified at least first object is that the object attribute data can be used to define the content of the at least first image data.

According to some embodiments, the method further comprises: associating object attribute data with a time stamp data; and determining the presence of the at least first object in the at least first image data dependent on the time of day, based on the object attribute data and the time stamp data.

An advantage with the time stamp data is that e.g. a history data describing when a certain object is present in the at least first image data can be generated and i.e. the relevance of the certain object in the at least first image, dependent on the time of the day.

According to some embodiments, the determining if the vehicle is at the reference parking location, the method comprises comparing object attribute data of the at least first reference image data with object attribute data of the obtained at least first image data.

An advantage with comparing object attribute data of the at least first image data with the object attribute data of the reference image data is that a less amount of the total image data is used that will enhance comparing the content of the reference image data with the content of the at least first image data, which in turn saves processing capacity and processing time of the processing circuitry.

According to some embodiments, it is determined that the vehicle is at the reference parking location when the attributes of the object attribute data of the obtained at least first image data equals, or is above a predefined object attribute threshold value, when comparing with the attributes of the object attribute data of the at least first reference image data.

An advantage with this is that the attribute data of the obtained at least first image data does not need to be equal to the object attribute data of the at least first reference image data, but a certain deviation from the object attribute data of the at least first reference image data can be allowed and still it can be determined that the vehicle is at the reference parking location.

According to some embodiments, in a determination that the vehicle is at the reference parking location, the method further comprises: obtaining, by the at least first camera, at least first image data of the surroundings of the vehicle while the vehicle remains at the reference parking location; and storing the at least first image data as further reference image data in the memory for providing additional reference image data to the reference image data collection of the vehicle parking finder support system.

An advantage with this is that over time further reference image data can be generated in order to better determine if the vehicle is at the reference parking location based on the additional reference image data. Over time the surroundings of the correct parking location may change and with further reference image data in the memory that is more recent, additional and new object attribute data of the at least first reference image can be used.

According to some embodiments, in a determination that the vehicle is not at the reference parking location, generating a notification message for controlling the parking of the vehicle, wherein the notification message is at least any of: an output message intended for the vehicle occupant, transmitted via the user interface, indicative of that the vehicle is not at the reference parking location; and/or a control message to a vehicle operation support system, for controlling the operation of the vehicle.

An advantage with this is that a vehicle occupant or a vehicle operation support system can take action to e.g. maneuver the vehicle to the correct parking location.

According to a third aspect there is provided a computer program product comprising a non-transitory computer readable medium, having thereon a computer program comprising program instructions, the computer program being loadable into a processing circuitry and configured to cause execution of the method according to any of the aspects when the computer program is run by the at least one processing circuitry.

Effects and features of the second and third aspects are to a large extent analogous to those described above in connection with the first aspect. Embodiments mentioned in relation to the first aspect are largely compatible with the second and third aspects.

The present disclosure will become apparent from the detailed description given below. The detailed description and specific examples disclose preferred embodiments of the disclosure by way of illustration only. Those skilled in the art understand from guidance in the detailed description that changes and modifications may be made within the scope of the disclosure.

Hence, it is to be understood that the herein disclosed disclosure is not limited to the particular component parts of the device described or steps of the methods described since such device and method may vary. It is also to be understood that the terminology used herein is for purpose of describing particular embodiments only, and is not intended to be limiting. It should be noted that, as used in the specification and the appended claims, the articles "a", "an", "the", and "said" are intended to mean that there are one or more of the elements unless the context explicitly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The above objects, as well as additional objects, features and advantages of the present disclosure, will be more fully appreciated by reference to the following illustrative and non-limiting detailed description of example embodiments of the present disclosure, when taken in conjunction with the accompanying drawings.

DETAILED DESCRIPTION

The present disclosure will now be described with reference to the accompanying drawings, in which preferred example embodiments of the disclosure are shown. The disclosure may, however, be embodied in other forms and should not be construed as limited to the herein disclosed embodiments. The disclosed embodiments are provided to fully convey the scope of the disclosure to the skilled person.

Figure 1A:
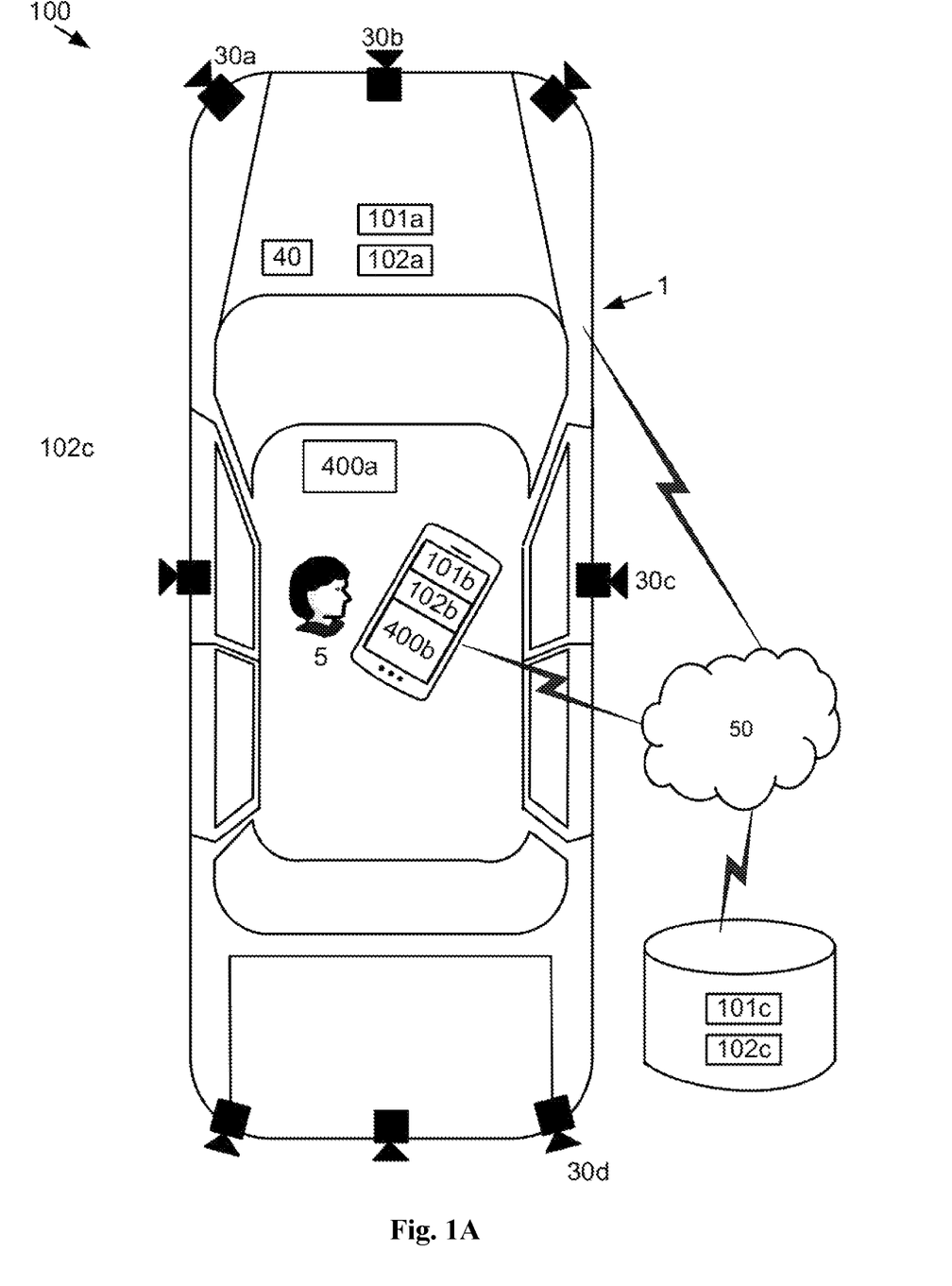
FIG. 1A illustrates an overview of the vehicle parking finder support system.

FIG. 1A illustrates an overview of the vehicle parking finder support system. The first aspect of this disclosure discloses a vehicle parking finder support system 100 for determining if a vehicle 1 is at a reference parking location.

According to some embodiments the reference parking location is a location within a predefined distance from a geographical position. According to some embodiments the reference parking location is a location defined by certain geographical boundaries. According to some embodiments the reference parking location is a location defined by boundaries of a parking lot. According to some embodiments the reference parking location refers to a desired or correct parking location. According to some embodiments the vehicle parking finder support system 100 is configured to determine if the vehicle 1 is at one reference parking location out of a plurality of reference parking locations. In an example a vehicle occupant may have a certain parking location at home, a certain parking location at work and a certain parking location at another location where the vehicle can be parked without violating rules and getting a parking ticket that are all reference parking locations.

Figure 1B:
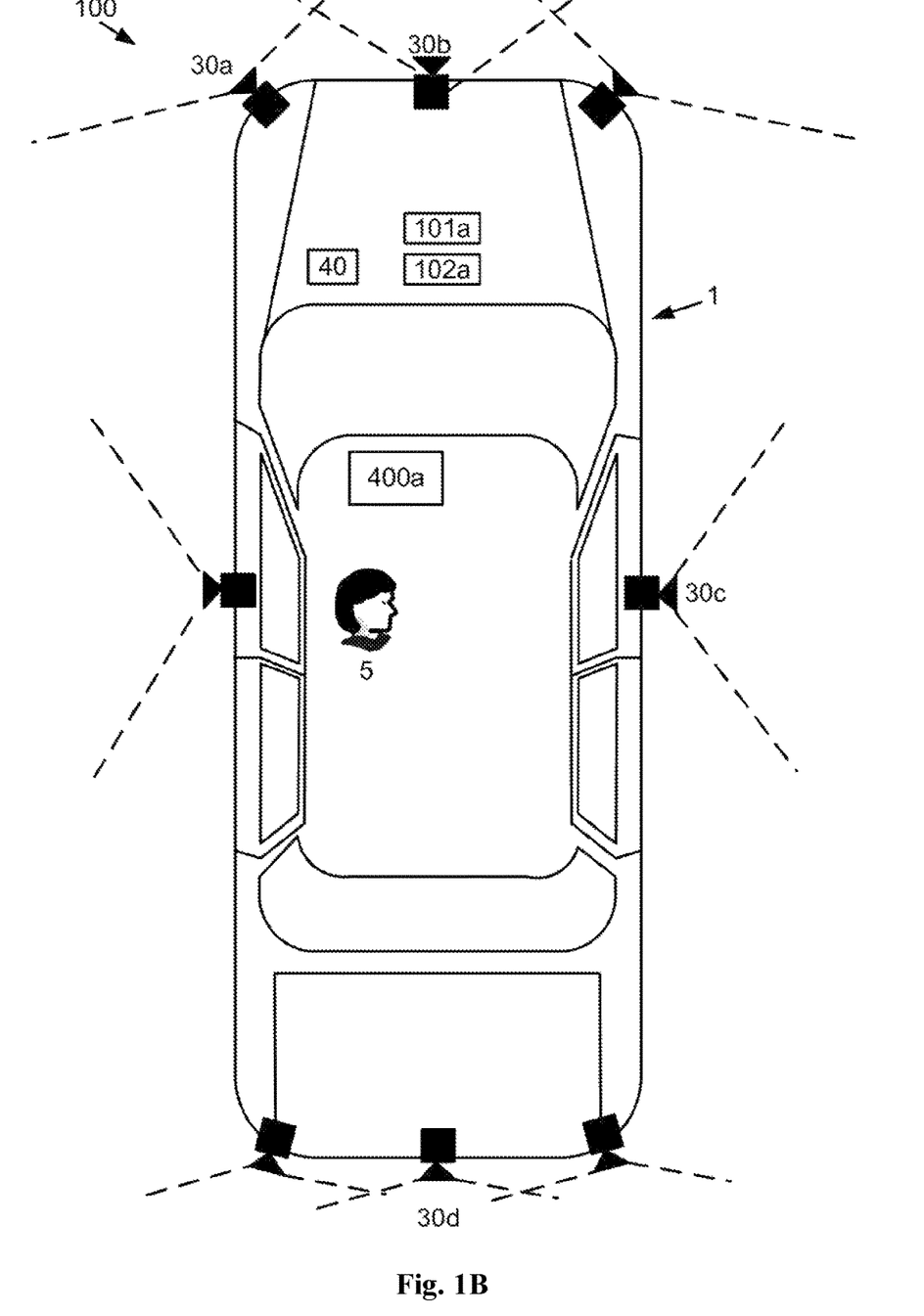
FIG. 1B illustrates the at least first camera configured to provide images of the surroundings of the vehicle.
Figure 2A:
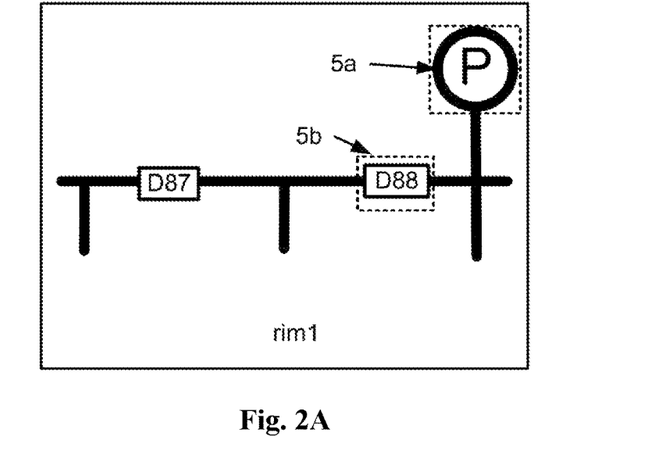
FIGS. 2A-2C illustrates a first example set of image data of the surroundings of the vehicle.
Figure 2B:
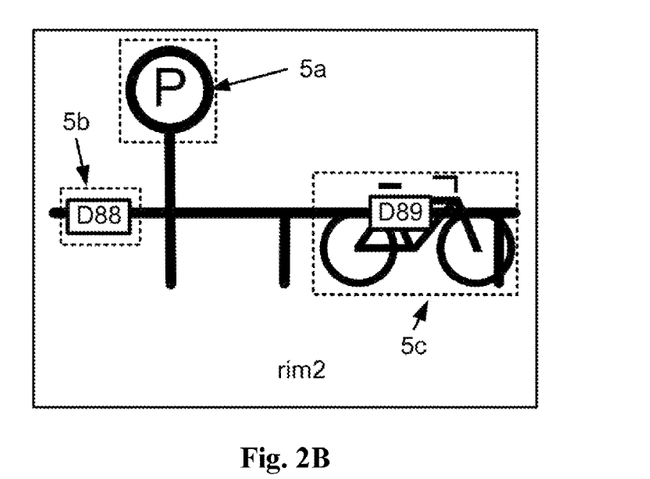
Figure 2C:
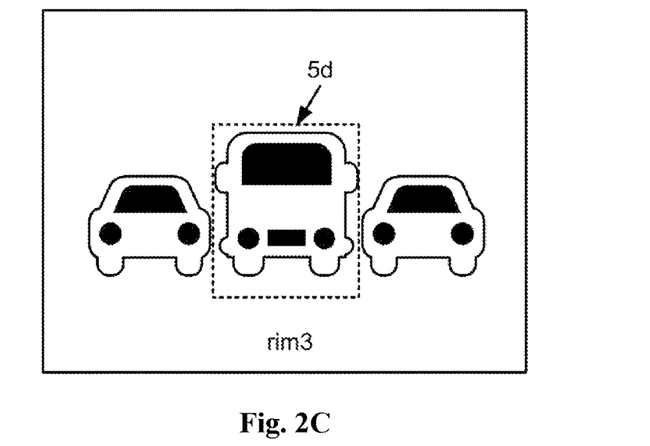
Figure 3A:
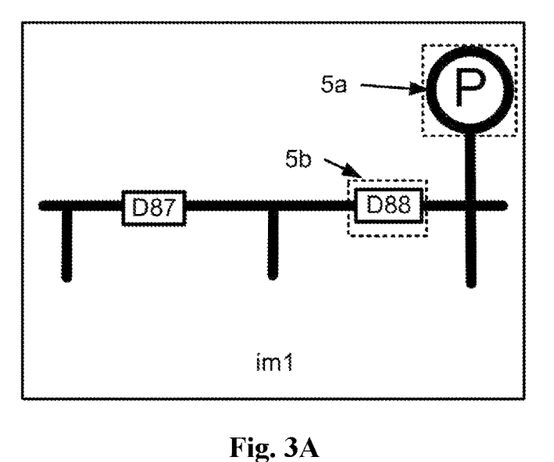
FIGS. 3A-3C illustrates a second example set of image data of the surroundings of the vehicle.
Figure 3B:
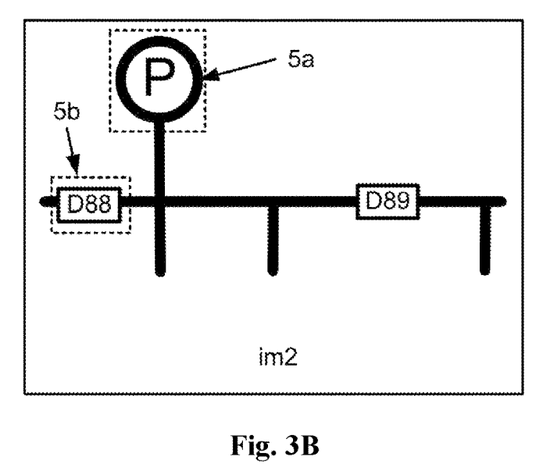
Figure 3C:
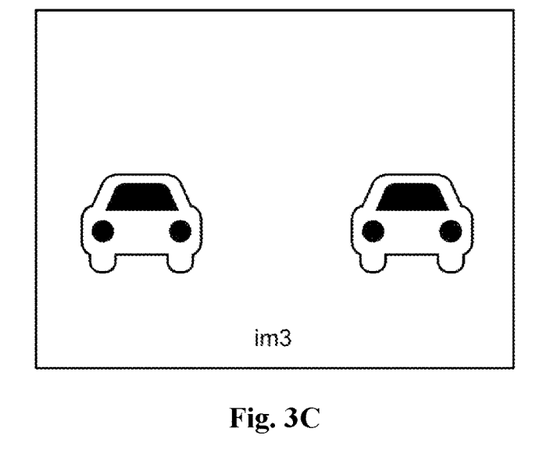

The vehicle parking finder support system 100 comprises at least a first camera 30a, 30b, 30c, 30d configured to provide images of the surroundings of the vehicle 1. FIG. 1B illustrates the at least first camera 30a, 30b, 30c, 30d configured to provide images of the surroundings of the vehicle. In an example the at least first camera 30a, 30b, 30c, 30d is mounted on the outside or on the inside of the vehicle 1. According to some embodiments the at least first camera 30a, 30b, 30c, 30d is integrated into the body of the vehicle 1. According to some embodiments the at least first camera 30a, 30b, 30c, 30d obtains at least first image data im1, im2, im3 of at least a first exterior view of the surroundings outside of the vehicle 1. FIGS. 2A-2C illustrates a first example set of obtained image data of the surroundings of the vehicle. FIGS. 3A-3C illustrates a second example set of obtained image data of the surroundings of the vehicle. According to some embodiments the at least first camera 30a, 30b, 30c, 30d obtains a wide angle view of the surroundings outside of the vehicle 1 by a wide angle lens of the at least first camera 30a, 30b, 30c, 30d. According to some embodiments the at least first camera 30a, 30b, 30c, 30d obtains is a telephoto view of the surroundings outside of the vehicle 1 by a telephoto lens of the at least first camera 30a, 30b, 30c, 30d. According to some embodiments vehicle parking finder support system 100 comprises a combination of different cameras 30a, 30b, 30c, 30d for providing both a wide angle view and a telephoto view of the surroundings outside of the vehicle 1. According to some embodiments, as illustrated in FIG. 1B, a first camera 30a and a second camera 30b are configured to obtain at least a first exterior view and a second exterior view that are overlapping. This is exemplified further in the FIGS. 2A and 2B where the "D88" sign and the "P" sign are overlapping in the first image data im1 and the second image data im2.

The vehicle parking finder support system 100 further comprises a memory 101a, 101b, 101c configured to store data. According to some embodiments the memory 101a is the memory of an on-board vehicle computer. According to some embodiments the memory 101b is comprised in a portable electronic device connected to vehicle parking finder support system 100 via a wireless communication network 50, as illustrated in FIG. 1A. According to some embodiments the memory 101c is comprised in an electronic device connected to vehicle parking finder support system 100 via a wireless communication network 50, as illustrated in FIG. 1A.

The vehicle parking finder support system 100 further comprises a processing circuitry 102a, 102b, 102c. According to some embodiments the processing circuitry 102a is the processing circuitry of an on-board vehicle computer. According to some embodiments the processing circuitry 102b is comprised in a portable electronic device connected to vehicle parking finder support system 100 via a wireless communication network 50, as illustrated in FIG. 1A. According to some embodiments the processing circuitry 102b is comprised in a portable electronic device connected to vehicle parking finder support system 100 via a wired connection. According to some embodiments the processing circuitry 102c is comprised in an electronic device connected to vehicle parking finder support system 100 via a wireless communication network 50, as illustrated in FIG. 1A.

In one example the wireless communication network 50, as illustrated in FIG. 1A is a standardized wireless local area network such as a Wireless Local Area Network, WLAN, Bluetooth™, ZigBee, Ultra-Wideband, Near Field Communication, NFC, Radio Frequency Identification, RFID, or similar network. In one example the wireless communication network 50 is a standardized wireless wide area network such as a Global System for Mobile Communications, GSM, Extended GSM, General Packet Radio Service, GPRS, Enhanced Data Rates for GSM Evolution, EDGE, Wideband Code Division Multiple Access, WCDMA, Long Term Evolution, LTE, Narrowband-IoT, 5G, Worldwide Interoperability for Microwave Access, WiMAX or Ultra Mobile Broadband, UMB or similar network. According to some aspects wireless communication network 50 can also be a combination of both a local area network and a wide area network. According to some embodiments the wireless communication network 50 is defined by common Internet Protocols.

The processing circuitry 102a, 102b, 102c is operatively connected to the at least first camera 30a, 30b, 30c, 30d and the memory 101a, 101b, 101c, configured to cause the vehicle parking finder support system 100 to obtain, by the at least first camera 30a, 30b, 30c, 30d, at least first image data im1, im2, im3 of the surroundings of the vehicle 1; obtain, from the memory 101a, 101b, 101c, at least first reference image data rim1, rim2, rim3; and determine if the vehicle 1 is at the reference parking location using the at least first reference image data rim1, rim2, rim3 and the obtained at least first image data im1, im2, im3.

An advantage is that the content of the reference image data can be used for comparing the content of the at least first image data of the surroundings of the vehicle to determine if the vehicle is at the reference parking location. According to some embodiments the at least first reference image data rim1, rim2, rim3 comprising previously obtained image data of the surroundings of the vehicle 1. According to some embodiments the at least first reference image data rim1, rim2, rim3 comprising previously obtained image data of the surroundings of the vehicle 1 at a desired location to be used as the reference parking location.

According to some embodiments the at least first reference image data rim1, rim2, rim3 comprising video image data. According to some embodiments the vehicle 1 is moving when determining if the vehicle 1 is at a reference parking location. According to some embodiments the vehicle 1 is moving when determining if the vehicle 1 is at a reference parking location and the obtained at least first image data im1, im2, im3 comprising video data. According to some embodiments the vehicle 1 is moving when determining if the vehicle 1 is at a reference parking location and the at least first reference image data rim1, rim2, rim3 comprising video image data.

According to some embodiments the at least first reference image data rim1, rim2, rim3 is associated with a direction data. According to some embodiments the direction data comprising the exterior view direction of the at least first camera 30a, 30b, 30c, 30d in relation to the direction of travel of the vehicle 1. According to some embodiments, the direction data is defined by vector data in a three dimensional space.

In an example the reference image data rim1, rim2, rim3 is illustrated in the FIGS. 2A-2C and the obtained image data im1, im2, im3 is illustrated in FIGS. 3A-3C. The at least first reference image data rim1, rim2, rim3 and the obtained at least first image data im1, im2, im3 are then used to determine if the vehicle 1 is at the reference parking location.

According to some embodiments the vehicle parking finder support system 100 further comprises a user interface 400a, 400b. According to some embodiments the user interface 400a is the user interface of an on-board vehicle computer. According to some embodiments the user interface 400b is comprised in a portable electronic device connected to vehicle parking finder support system 100 via a wireless communication network 50, as illustrated in FIG. 1A. According to some embodiments the vehicle parking finder support system 100 further comprises at least a first display configured to display the at least first exterior view provided by the at least first camera 30a, 30b, 30c, 30d. According to some embodiments the at least first display is a part of the vehicle parking finder support system 100. According to some embodiments the at least first display is integrated in the dashboard of the vehicle. According to some embodiments the at least first display is a head-up display that is visible at or on at least a first window of the vehicle 1. According to some embodiments the at least first display is a separate display unit that can be placed at a desired location in the vehicle 1 by the vehicle occupant 5. According to some embodiments the at least first display is a display that is comprised in a portable electronic device connected to vehicle parking finder support system 100 via a wireless communication network 50. According to some embodiments the at least a first display is a touch sensible display configured to operate as the user interface 400a, 400b.

The user interface 400a, 400b is operatively connected to the processing circuitry 102a, 102b, 102c configured to receive user input by a vehicle occupant 5, and the processing circuitry 102a, 102b, 102c is further configured to, cause the vehicle parking finder support system 100 to receive, via the user interface 400a, 400b, a first input by the vehicle occupant 5 indicative of that the vehicle 1 is at the reference parking location; obtain, by the at least first camera 30a, 30b, 30c, 30d, at least first image data im1, im2, im3 of the surroundings of the vehicle 1 while the vehicle 1 remains at the reference parking location; and store the at least first image data im1, im2, im3 as reference image data rim1, rim2, rim3 in the memory 101a, 101b, 101c. According to some embodiments the processing circuitry 102a, 102b, 102c is further configured to determine if the vehicle 1 is not moving and prompt a vehicle occupant 5, via the user interface 400a, 400b to indicate, by a first input, if the vehicle 1 is at the reference parking location. According to some embodiments it can be determined if the vehicle 1 is not moving by determining at least one of that: the vehicle is turned off; the parking brake is applied; the vehicle 1 has been idle longer than a predetermined time; the vehicle is driving at a speed slower than a predetermined value. In an example, each of the cameras 30a, 30b and 30d obtains image data of the surroundings of the vehicle 1 simultaneously while the vehicle 1 remains at the reference parking location. The cameras 30a, 30b and 30d obtain the image data as illustrated in FIGS. 2A-2C. In the example, the obtained image data is then stored as reference image data rim1, rim2, rim3 as illustrated in FIGS. 2A-2C.

An advantage is that the vehicle occupant 5 can indicate to the vehicle parking finder support system 100 via the user interface 400a, 400b when the vehicle 1 is at the location that is going to be the reference parking location, so that the obtained at least first image data of the surroundings of the vehicle 1 while the vehicle remains at the reference parking location, can be stored as reference image data in the memory.

According to some embodiments the vehicle parking finder support system 100 further comprises a position sensor 40. According to some embodiments the position sensor 40 is a Global Positioning System sensor. FIGS. 1A and 1B illustrates the position sensor 40 as a part of the vehicle. According to some embodiments position sensor is comprised in a portable electronic device connected to vehicle parking finder support system 100 via a wireless communication network 50. According to some embodiments the position sensor is operatively connected to the processing circuitry 102a, 102b, 102c configured to determine the geographical location of the vehicle 1, and the processing circuitry 102a, 102b, 102c is further configured to, cause the vehicle parking finder support system 100 to obtain, by the position sensor 40, parking location data associated with the location of the vehicle 1 while the vehicle 1 remains at the reference parking location; and store the parking location data as reference parking location data.

An advantage with this is that the vehicle occupant can then indicate to the vehicle parking finder support system 100 via the user interface 400a, 400b when the vehicle is at the location that is going to be the reference parking location, so that the obtained parking location data then can be stored as reference parking location data in the memory.

According to some embodiments the processing circuitry 102a, 102b, 102c is further configured to cause the vehicle parking finder support system 100 to: obtain, by the position sensor 40, parking location data associated with the location of the vehicle 1; obtain, from the memory 101a, 101b, 101c, reference parking location data; and determine if the vehicle 1 is at the reference parking location using the reference parking location data and the obtained parking location data. An advantage with this is that the information about the geographical location of the vehicle 1 can hence be compared with the reference parking location data to determine if the vehicle 1 is back at the reference parking location. According to some embodiments the reference parking location data is used in addition to the reference image data rim1, rim2, rim3 to determine if the vehicle 1 is at the reference parking location.

According to some embodiments the processing circuitry 102a, 102b, 102c is further configured to, cause the vehicle parking finder support system 100 to identify the presence of at least a first object 5a, 5b, 5c, 5d in the at least first image data im1, im2, im3 by object recognition processing of the at least first image data im1, im2, im3; and store attributes of the identified at least first object 5a, 5b, 5c, 5d as object attribute data in the memory 101a, 101b, 101c. An advantage with identifying the presence of at least a first object 5a, 5b, 5c, 5d and storing attributes of the identified at least first object 5a, 5b, 5c, 5d is that the object attribute data can be used to define the content of the at least first image data im1, im2, im3. This in turn can be used when e.g. comparing the content of the at least first image data im1, im2, im3 with the content of the reference image data rim1, rim2, rim3. According to some embodiments the attributes of the identified at least first object 5a, 5b, 5c, 5d comprising at least any of a color; a vehicle model; a vehicle brand; a text; a number; an object category; a text and number; a shape; a form factor; a status. In an example an identified object is stored with attributes such as "vehicle", "Geely", "SUV", "license plate number ABC12A" and "green". In the example illustrations in FIG. 2A the attributes of the object 5a are "road sign", "parking", "blue" and "static", the attributes of the object 5b are "number", "D88", "white" and "static". Further, in the example in FIG. 2B the attributes of the object 5c are "bike", "vehicle", "red" and "movable". Further, in the example in FIG. 2C the attributes of the object 5d are "truck", "white" and "movable".

According to some embodiments the processing circuitry 102a, 102b, 102c is further configured to, cause the vehicle parking finder support system 100 to identify the presence of at least a first object 5a, 5b, 5c, 5d in the at least first image data im1, im2, im3 by object recognition processing of the at least first image data im1, im2, im3; store attributes of the identified at least first object 5a, 5b, 5c, 5d as object attribute data in the memory 101a, 101b, 101c; determine an object weight value dependent on the attribute of the at least first object 5a, 5b, 5c, 5d; and store attributes of the identified at least first object 5a, 5b, 5c, 5d together with the determined object weight value as object attribute data in the memory 101a, 101b, 101c.

According to some embodiments, the object weight value is used to determine if the vehicle 1 is at the reference parking location, wherein the object weight value is used for giving at least a first object 5a, 5b, 5c, 5d a higher importance in the determination if the vehicle 1 is at the reference parking location. In an example, an object with the attribute "movable" may be of less importance compared to another object with the attribute "static". In an example, a sign given the attribute "static" may have a higher importance than a truck that is given the attribute "movable".

According to some embodiments the reference image data rim1, rim2, rim3 further comprises personal attribute data associated with at least any of the vehicle 1 and the vehicle occupant 5. In an example the personal attribute data comprising any of the name of the vehicle occupant, the license plate number of the vehicle 1 and the name of e.g. a company, an organization or an association that is associated with any of the vehicle occupant 5 and the vehicle 1. According to some embodiments the personal attribute data is indicated by a personal attribute selection input by the vehicle occupant 5 via the user interface 400a, 400b indicative of that the attribute data is personal attribute data. According to some embodiments the processing circuitry 102a, 102b, 102c is further configured to, cause the vehicle parking finder support system 100 to obtain, from the memory 101a, 101b, 101c, at least first reference image data rim1, rim2, rim3 comprising personal attribute data; and determine if the vehicle 1 is at the reference parking location using the at least first reference image data rim1, rim2, rim3 comprising personal attribute data and the obtained at least first image data im1, im2, im3.

Figure 4A:
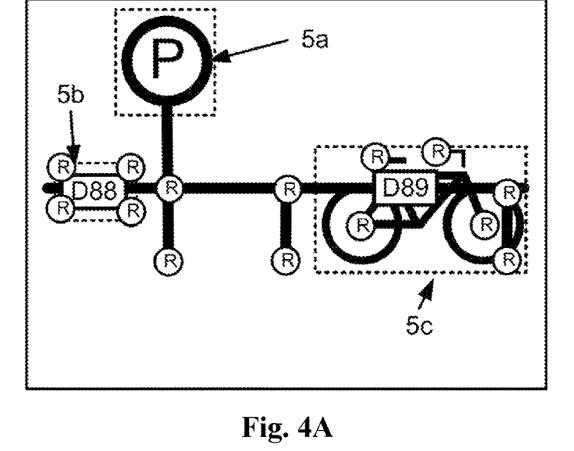
FIG. 4A-4C illustrates example object attribute data according to the disclosure.

According to some embodiments the object attribute data is based on at least a first reference point R found in the image by object recognition processing of the at least first image data im1, im2, im3. FIG. 4A illustrates example reference points R. According to some embodiments when storing attributes of the identified at least first object 5a, 5b, 5c, 5d as object attribute data in the memory 101a, 101b, 101c, the object attribute data is based on specific reference points R found in the image by object recognition processing of the at least first image data im1, im2, im3. FIG. 4A illustrates an example where specific reference points R, that are found in the image by object recognition processing of the at least first image data im1, im2, im3, are used when storing attributes of the identified at least first object 5*a*, 5*b*, 5*c*, 5*d* as object attribute data in the memory 101*a*, 101*b*, 101*c*.

In an example, the obtained image data, comprising the object attribute data of the identified objects 5*a*, 5*b*, 5*c*, 5*d*, is stored as reference image data rim1, rim2, rim3, in the memory 101*a*, 101*b*, 101*c*. In the example the at least first reference image data rim1, rim2, rim3 and the obtained at least first image data im1, im2, im3 comprising object attribute data, is used to determine if the vehicle 1 is at the reference parking location. In the example the reference image data rim1, rim2, rim3 is illustrated in the FIGS. 2A-2C and the obtained image data im1, im2, im3 is illustrated in FIGS. 3A-3C. The at least first reference image data rim1, rim2, rim3 and the obtained at least first image data im1, im2, im3 are then used to determine if the vehicle 1 is at the reference parking location. When comparing the image data as illustrated in FIGS. 2A and 3A nothing is changed, which indicates that the vehicle 1 seems to be at the reference parking location. However, when comparing the image data as illustrated in FIGS. 2B and 3B the object 5*c*, the bike, is missing. Further, when comparing the image data as illustrated in FIGS. 2C and 3C the object 5*d*, the truck, is missing. Even if there is a deviation in the image data, the vehicle parking finder support system 100 may still determine that the vehicle 1 is at the reference parking location if e.g. a certain number of objects can be identified.

According to some embodiments the processing circuitry 102*a*, 102*b*, 102*c* is further configured to, cause the vehicle parking finder support system 100 to: associate object attribute data with a time stamp data; and determine the presence of the at least first object 5*a*, 5*b*, 5*c* in the at least first image data im1, im2, im3 dependent on the time of day, based on the object attribute data and the time stamp data. An advantage with the time stamp data is that e.g. a history data describing when a certain object is present in the at least first image data can be generated and i.e. the relevance of the certain object in the at least first image can be determined dependent on the time of the day. E.g. in an example, the certain object occurred with a 95% certainty between 17:30 and 07:00 over the last 20 days. If the certain object is not present at 21:00 the next day a flag may be generated by the vehicle parking finder support system to indicate a deviation from the normal presence of the certain object, and that this in turn may be an indication that the vehicle 1 may be at a wrong parking location. According to some embodiments the processing circuitry 102*a*, 102*b*, 102*c* is further configured to, cause the vehicle parking finder support system 100 to: associate object attribute data with a time stamp data; and determine the presence of the at least first object 5*a*, 5*b*, 5*c* in the at least first image data im1, im2, im3 dependent on the day of the year, based on the object attribute data and the time stamp data. In an Example it is determined if the day of the year is a working day or a non-working day, a weekday or a weekend, or a holiday. According to some embodiments the time stamp data can also be used if there is a change in the normal surroundings of the vehicle 1. If e.g. the owner of a neighboring vehicle, that usually is parked beside the vehicle 1, trades the neighboring vehicle for a new neighboring vehicle the surroundings of the vehicle 1 is changed. With the time stamp data the new neighboring vehicle will over time be the expected vehicle to be beside the vehicle 1. The same situation applies if the neighboring parking is changing owner or user.

Figure 5:
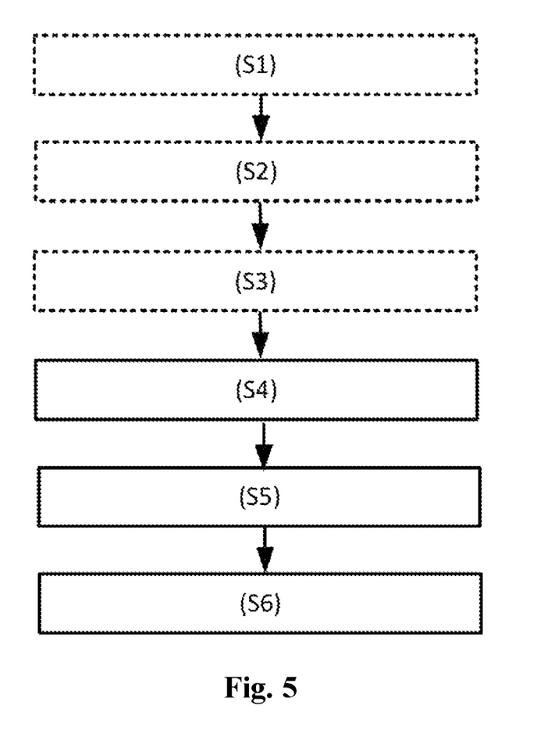
FIG. 5 illustrates a flow chart of the method steps according to the disclosure.
Figure 6:
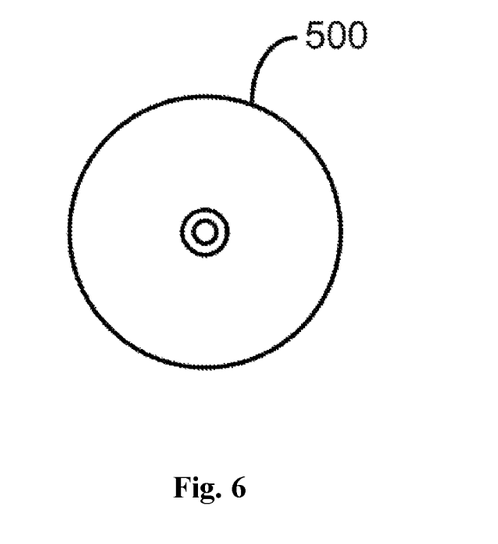
FIG. 6 illustrates a computer program product according to some aspects of the disclosure.

The second aspect of this disclosure shows a method for determining if a vehicle 1 is at a reference parking location. FIG. 5 illustrates a flow chart of the method steps according to the disclosure. The method comprising the step S4 obtaining, by at least a first camera 30*a*, 30*b*, 30*c*, 30*d*, at least first image data im1, im2, im3 of the surroundings of the vehicle 1; the step S5 obtaining, from a memory 101*a*, 101*b*, 101*c*, at least first reference image data rim1, rim2, rim3; and the step S6 determining if the vehicle 1 at the reference parking location using the at least first reference image data rim1, rim2, rim3 and the obtained at least first image data im1, im2, im3.

An advantage is that the content of the reference image data can be used for comparing the content of the at least first image data of the surroundings of the vehicle to determine if the vehicle is at the reference parking location.

According to some embodiments the method further comprises the step: S1 receiving, via a user interface 400*a*, 400*b*, a first input by the vehicle occupant indicative of that the vehicle 1 is at a reference parking location; the step S2 obtaining, by the at least first camera 30*a*, 30*b*, 30*c*, 30*d*, at least first image data im1, im2, im3 of the surroundings of the vehicle 1 while the vehicle 1 remains at the reference parking location; and the step S3 storing the at least first image data im1, im2, im3 as reference image data rim1, rim2, rim3 in the memory 101*a*, 101*b*, 101*c*.

An advantage is that the vehicle occupant 5 can then indicate to the vehicle parking finder support system 100 via the user interface 400*a*, 400*b* when the vehicle 1 is at the location that is going to be the reference parking location, so that the obtained at least first image data of the surroundings of the vehicle, while the vehicle remains at the reference parking location, can be stored as reference image data rim1, rim2, rim3 in the memory 101*a*, 101*b*, 101*c*.

According to some embodiments when storing the at least first image data im1, im2, im3 as reference image data rim1, rim2, rim3 in the memory (101*a*, 101*b*, 101*c*), attributes of the identified at least first object 5*a*, 5*b*, 5*c*, 5*d* in the at least first image data im1, im2, im3 is stored together with the reference image data rim1, rim2, rim3 in the memory 101*a*, 101*b*, 101*c*.

According to some embodiments the method further comprises: identifying the presence of at least a first object 5*a*, 5*b*, 5*c*, 5*d* in the at least first image data im1, im2, im3 by object recognition processing of the at least first image data im1, im2, im3; and storing attributes of the identified at least first object 5*a*, 5*b*, 5*c*, 5*d* as object attribute data in the memory 101*a*, 101*b*, 101*c*.

An advantage with identifying the presence of at least a first object and storing attributes of the identified at least first object is that the object attribute data can be used to define the content of the at least first image data.

According to some embodiments the method further comprises: associating object attribute data with a time stamp data; and determining the presence of the at least first object 5*a*, 5*b*, 5*c* in the at least first image data im1, im2, im3 dependent on the time of day, based on the object attribute data and the time stamp data.

An advantage with the time stamp data is that e.g. a history data describing when a certain object is present in the at least first image data can be generated and i.e. the relevance of the certain object in the at least first image, dependent on the time of the day.

According to some embodiments when determining if the vehicle 1 is at the reference parking location, the method comprises comparing object attribute data of the at least first reference image data rim1, rim2, rim3 with object attribute data of the obtained at least first image data im1, im2, im3.

An advantage with comparing object attribute data of the at least first image data with the object attribute data of the reference image data is that less information is used that will enhance comparing the content of the reference image data with the content of the at least first image data, which in turn saves processing capacity and processing time of the processing circuitry.

An advantage with comparing object attribute data of the at least first image data with the object attribute data of the reference image data is that less data of the total image data is used that will enhance comparing the content of the reference image data with the content of the at least first image data, which in turn saves processing capacity and processing time of the processing circuitry.

According to some embodiments when comparing the attribute data of the at least first image data with the object attribute data of the reference image data, specific reference points of the reference image data is used for determining if the same reference points exist in the at least first image data.

According to some embodiments it is determined that the vehicle 1 is at the reference parking location when the attributes of the object attribute data of the obtained at least first image data im1, im2, im3 equals, or is above a predefined object attribute threshold value, when comparing with the attributes of the object attribute data of the at least first reference image data rim1, rim2, rim3. An advantage with this is that the attribute data of the obtained at least first image data does not need to be equal to the object attribute data of the at least first reference image data, but a certain deviation from the object attribute data of the at least first reference image data can be allowed and still it can be determined that the vehicle 1 is at the reference parking location.

In an example as illustrated in FIG. 4A, the objects; the parking sign 5a, the number sign 5b and the bike 5c, are identified in an image by object recognition processing of the image data. Attributes of the identified objects 5a, 5b, 5c are stored as object attribute data in the memory 101a, 101b, 101c. In the example the image data is stored as reference image data together with attributes of the identified objects 5a, 5b, 5c in the memory 101a, 101b, 101c.

Figure 4B:
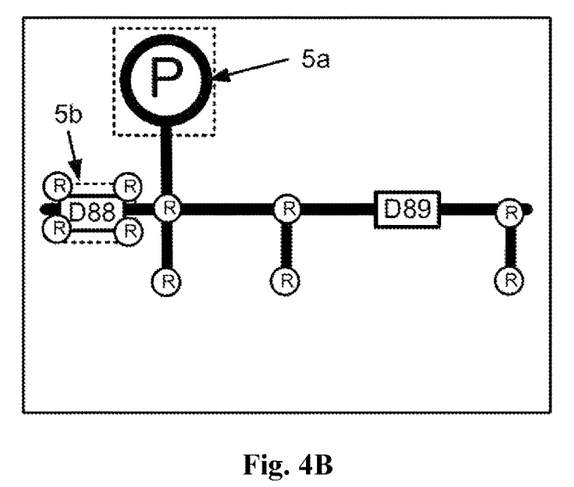
Figure 4C:
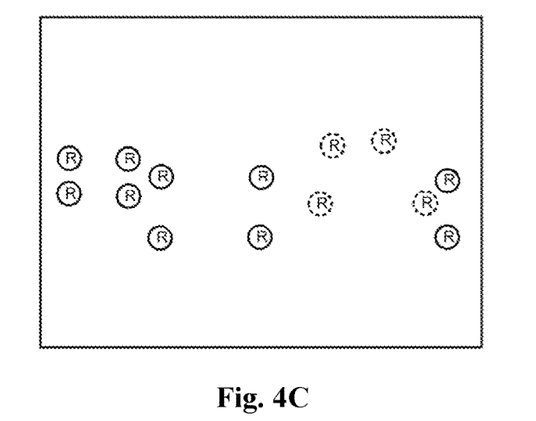

According to some embodiments the object attribute data comprising at least a first reference point R identified by object recognition processing of the at least first image data im1, im2, im3. In the example the attributes of the identified objects 5a, 5b, 5c are based on a number of reference points R as illustrated in FIG. 4A. At a later point in time when the vehicle is at the same location, it is determined that a certain number of reference points R are not present when comparing the attribute data of the obtained image, illustrated in FIG. 4B, with the object attribute data of the at least first reference image. In particular, the bike 5c that was present when the at least first reference image data was stored is no longer at the location. In the example the four reference points of the bike 5c does exist, but the remaining reference points R exits, as illustrated in FIG. 4B. In the example the bike 5c is removed, but reference points can also be non-detectable due to e.g. that an object is covered by snow etc. In the example, 4 out of 14 reference points are missing, which makes the attribute data of the obtained image to deviate from the object attribute data of the at least first reference image data. The deviation is based on the missing reference points, illustrated with reference points R having dotted lines in the FIG. 4C. In the example the object attribute threshold value is set to allow object attribute data of the obtained image that is matching the object attribute data of the at least first reference image data to 70% or more. With 10 existing reference points out of 14 in the example means that 71% of the reference points seem to be right and in the example it is therefore determined that the vehicle 1 is at the reference parking location. According to some embodiments a plurality of images and a plurality of reference images are used for determining if the vehicle 1 is at the reference parking location. According to some embodiments a plurality of image data associated with certain object attribute data is compared with a plurality of reference image data associated with certain object attribute data for determining if the vehicle 1 is at the reference parking location. According to some embodiments the object attribute data of plural image data im1, im2, im3 is compared with the object attribute data of plural reference image data rim1, rim2, rim3. In an example when the obtained first image data im1 is compared with the first reference image data rim1, as illustrated in FIG. 2A and FIG. 2B, the object attribute data of the obtained first image data im1 is matching the object attribute data of the first reference image data rim1 to 100%. In the same example when the obtained second image data im2 is compared with the second reference image data rim2, as illustrated in FIG. 2B and FIG. 3B, the object attribute data of the obtained second image im2 is matching the object attribute data of the second reference image data rim2 to 67%. In the same example when the obtained third image data im3 is compared with the third reference image data rim3, as illustrated in FIG. 2C and FIG. 3C, the object attribute data of the obtained third image im3 is matching the object attribute data of the third reference image data rim3 to 78%. In the example the total matching is 83% which in the example is above a set object attribute threshold value of 70%, which then leads to a determination that the vehicle 1 is at the reference parking location. If the matching for each obtained image would have been different, and the total matching would have been below the set object attribute threshold value of 70%, then it would have been determined that the vehicle 1 is not at the reference parking location.

According to some embodiments in a determination that the vehicle 1 is at the reference parking location, the method further comprises: obtaining, by the at least first camera, at least first image data of the surroundings of the vehicle 1 while the vehicle 1 remains at the reference parking location; and storing the at least first image data as further reference image data in the memory 101a, 101b, 101c for providing additional reference image data to the reference image data collection of the vehicle parking finder support system 100.

An advantage with this is that over time further reference image data can be generated in order to better determine if the vehicle is at the reference parking location based on the additional reference image data. Over time the surroundings of the correct parking location may change and with further reference image data in the memory that is more recent, additional and new object attribute data of the at least first reference image can be used.

According to some embodiments in a determination that the vehicle 1 is not at the reference parking location, generating a notification message for controlling the parking of the vehicle, wherein the notification message is at least any of: an output message intended for the vehicle occupant, transmitted via the user interface 400a, 400b, indicative of that the vehicle 1 is not at the reference parking location; and/or a control message to a vehicle operation support system, for controlling the operation of the vehicle 1.

An advantage with this is that a vehicle occupant or a vehicle operation support system can take action to e.g. maneuver the vehicle to the correct parking location.

The third aspect of this disclosure shows a computer program product the second aspect comprising a non-transitory computer readable medium, having thereon a computer program comprising program instructions, the computer program being loadable into a processing circuitry 102a, 102b, 102c and configured to cause execution of the method according to any of the second aspect through 14 when the computer program is run by the at least one processing circuitry 102.

The person skilled in the art realizes that the present disclosure is not limited to the preferred embodiments described above. The person skilled in the art further realizes that modifications and variations are possible within the scope of the appended claims. Additionally, variations to the disclosed embodiments can be understood and effected by the skilled person in practicing the claimed disclosure, from a study of the drawings, the disclosure, and the appended claims.

What is claimed is:

1. A vehicle parking finder support system for determining if a vehicle is at a reference parking spot, the vehicle parking finder support system comprises:
   at least a first camera configured to provide images of surroundings of the vehicle;
   a memory configured to store data; and
   a processing circuitry operatively connected to the at least first camera and the memory, configured to cause the vehicle parking finder support system to confirm that the vehicle is parked at the reference parking spot, the reference parking spot being a parking spot that the vehicle has prior authorization to use for parking, the confirming including:
      determine that the vehicle has prior authorization to use for parking;
      configure parking reference data associated with the reference parking spot at a first time, including:
         receive, via a user interface, a first input from an occupant of the vehicle indicative of that the vehicle is at the reference parking spot;
         obtain, by the at least first camera, a first image data of the surroundings of the vehicle while the vehicle remains at the reference parking spot;
         store the first image data as reference image data in the memory;
      verify that the vehicle has returned to the reference parking spot at a second time that is later in time than the first time, including:
         obtain, by the at least first camera, a second image data of the surroundings of the vehicle;
         obtain, from the memory, the first reference image data; and
         determine if the vehicle is at the reference parking spot by comparing the first reference image data and the obtained second image data.

2. The vehicle parking finder support system according to claim 1, wherein the vehicle parking finder support system further comprising a position sensor operatively connected to the processing circuitry configured to determine the geographical location of the vehicle, and the processing circuitry is further configured to cause the vehicle parking finder support system to:
   obtain, by the position sensor, parking location data associated with the
   location of the vehicle while the vehicle remains at the reference parking spot; and
   store the parking location data as reference parking location data.

3. The vehicle parking finder support system according to claim 2, wherein the processing circuitry is further configured to cause the vehicle parking finder support system to:
   obtain, by the position sensor, parking location data associated with the location of the vehicle;
   obtain, from the memory, reference parking location data; and
   determine if the vehicle is at the reference parking spot using the reference parking location data and the obtained parking location data.

4. The vehicle parking finder support system according to claim 1, wherein the processing circuitry is further configured to, cause the vehicle parking finder support system to:
   identify a presence of at least a first object in the at least first image data by object recognition processing of the at least first image data; and
   store attributes of the identified at least first object as object attribute data in the memory.

5. The vehicle parking finder support system according to claim 4, wherein the processing circuitry is further configured to, cause the vehicle parking finder support system to:
   associate the object attribute data with a time stamp data; and
   determine the presence of the at least first object in the at least first image data dependent on a time of day, based on the object attribute data and the time stamp data.

6. A method for determining if a vehicle is at a reference parking spot, the method comprising confirming that the vehicle is parked at the reference parking spot, the reference parking spot being a parking spot that the vehicle has prior authorization to use for parking, the confirming including:
   determining that the vehicle has prior authorization to use for parking;
   configuring parking reference data associated with the reference parking spot at a first time, including
      receiving, via a user interface, a first input from an occupant of the vehicle indicative of that the vehicle is at the reference parking spot;
      obtaining, by at least a first camera, a first image data of surroundings of the vehicle while the vehicle remains at the reference parking spot;
      storing the first image data as reference image data in a memory;
   verifying that the vehicle has returned to the reference parking spot at a second time that is later in time than the first time, including:
      obtaining, by the at least first camera, a second image data of the surroundings of the vehicle;
      obtaining, from the memory, the first reference image data; and
      determining if the vehicle is at the reference parking spot by comparing the first reference image data and the obtained second image data.

7. The method according to claim 6, the method further comprising:
   identifying a presence of at least a first object in the at least first image data by object recognition processing of the at least first image data; and
   storing attributes of the identified at least first object as object attribute data in the memory.

8. The method according to claim 7, the method further comprising:
   associating the object attribute data with a time stamp data; and determining the presence of the at least first object in the at least first image data dependent on a time of day, based on the object attribute data and the time stamp data.

9. The method according to claim 6, wherein the determining if the vehicle is at the reference parking spot comprises comparing object attribute data of the at least first reference image data with object attribute data of the obtained at least second image data.

10. The method according to claim 9, wherein it is determined that the vehicle is at the reference parking spot when attributes of the object attribute data of the obtained at least first image data equals, or is above a predefined object attribute threshold value, with attributes of the object attribute data of the at least second reference image data.

11. The method according to claim 6, wherein following a determination that the vehicle is at the reference parking spot, the method further comprising:
    obtaining, by the at least first camera, additional image data of the surroundings of the vehicle while the vehicle remains at the reference parking spot; and
    storing the additional image data as further reference image data in the memory for providing additional reference image data to a reference image data collection of the vehicle parking finder support system.

12. The method according to claim 6, wherein further comprising, a third time, making a determination that the vehicle is not at the reference parking spot and generating a notification message for controlling the parking of the vehicle, wherein the notification message is at least any of:
    an output message, output via the user interface, indicative of that the vehicle is not at the reference parking spot; and/or
    a control message to a vehicle operation support system, for controlling the operation of the vehicle.

13. A non-transitory computer readable medium, having stored thereon a computer program comprising program instructions, the computer program being loadable into a processing circuitry and configured to cause execution of the method according to claim 6 when the computer program is run by the at least one processing circuitry.

* * * * *